June 10, 1969 KANESUKE KISHI ET AL 3,449,523

CONDENSER MICROPHONE APPARATUS

Filed Jan. 10, 1966

Inventors
Kanesuke Kishi
Hirotake Kawakami
Kiyoshi Yamanouchi by Hill, Sherman, Meroni, Gross & Simpson Attys.

United States Patent Office 3,449,523

Patented June 10, 1969

3,449,523

CONDENSER MICROPHONE APPARATUS

Kanesuke Kishi, Kawasaki-shi, and Hirotake Kawakami, and Kiyoshi Yamanouchi, Tokyo, Japan, assignors to Sony Corporation, Tokyo, Japan, a corporation of Japan Filed Jan. 10, 1966, Ser. No. 519,646
Claims priority, application Japan, Jan. 18, 1965, 40/2,636
Int. Cl. H04m *1/00;* H02m *3/22, 5/40*
U.S. Cl. 179—1 2 Claims

ABSTRACT OF THE DISCLOSURE

A condenser microphone apparatus which has a high output impedance as, for example, above 75 megohms at a frequency of 30 hertz and which is coupled through a condenser to the gate electrode of a field transistor connected with a source follower output in which a low voltage battery provides a power supply and is connected across the drain and source electrodes of the field effect transistor and with a DC to DC converter coupled to the low voltage battery and including a transistor oscillator with a rectifier and filter circuit connected to its output to provide a high voltage signal that is connected across the condenser microphone to provide a polarizing signal in the assembly of the condenser microphone, and the field effect transistor amplifier and the battery and converter mounted in a compact container.

This invention relates to condenser microphone apparatus and more particularly to such apparatus which may be assembled as a unitary structure including a power supply.

Condenser microphones as a class have several inherent advantages over alternative microphones. Among these advantages are a wide frequency response range, non-directional field pattern, low distortion and low internal noise. In these respects the condenser microphone often matches and excels in performance the other types of microphones presently in common use: the ribbon-velocity microphones, the dynamic microphone and the crystal microphone. However, condenser microphones have not, in the past, met with the acceptance their inherent advantages would merit primarily because of the disadvantage that they have required a bulky preamplifier and a heavy power supply to be employed making it relatively difficult and inconvenient to use.

A condenser microphone apparatus of conventional type employs a preamplifier of the cathode-follower-circuit type of high input impedance and low output impedance. In such a microphone the internal capacity of the condenser microphone head is usually about 50 micro-microfarads and impedance at a low audible frequency of, for example, 30 cycles per second is about 100 megohms. In order to connect such a condenser microphone to a usual impedance circuit of, for example, 600 ohms, a preamplifier is required having an input impedance of at least more than 100 to 300 megohms. Further, it is necessary to apply a DC polarized voltage to the condenser microphone head. These components have been, in the past, difficult to assemble and to handle. As a consequence, the condenser microphone has not achieved the acceptance and use that it merits.

It is, therefore, the object of this invention to provide a new and improved capacitor microphone apparatus.

It is an object of this invention to provide such a capacitor microphone apparatus which overcomes one or more of the limitations of prior condenser microphones.

It is another object of this invention to provide a small and portable condenser microphone apparatus having no power supply terminal.

It is a further object of this invention to provide a condenser microphone apparatus which is economic in construction and use and simple and easy of use.

In accomplishing these objects a condenser microphone apparatus is provided in which a condenser microphone head drives a transistorized preamplifier which is encased in a common assembly with the head and a source of DC voltage.

It is one feature of the present invention that a condenser microphone apparatus is provided with a field effect transistor as the amplifying element.

It is another feature of this invention to provide a condenser microphone apparatus in which a condenser microphone head, a preamplifier, a DC-DC converter and battery are assembled within a container of the microphone as one unit thereof.

The organization and manner of operation of the invention, together with further objects and advantages thereof may best be understood by reference to the following description taken in connection with the accompanying drawings, in the several figures of which like reference numerals identify like elements, and in which an exemplification of the invention is illustrated.

Figure 1:
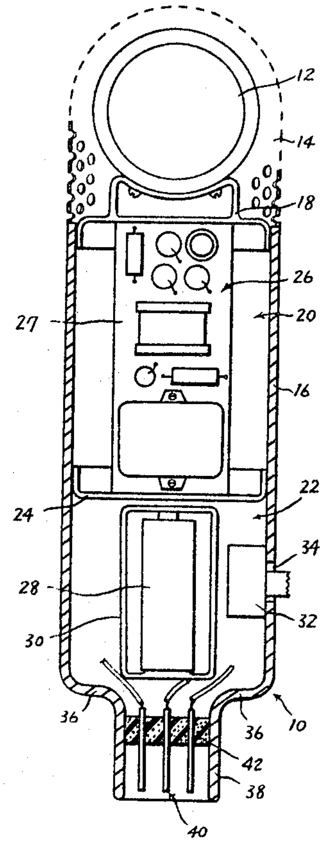
FIG. 1 is a longitudinal plan view, partly in section, of a condenser microphone apparatus constructed in accordance with the principles of the present invention.

Referring to FIG. 1, a condsener microphone apparatus constructed in accordance with the principles of the invention and generally indicated by the numeral 10 is there depicted. The apparatus 10 comprises a compact assembly of a generally cylindrical shape with one end comprising a condenser head 12. The head 12 may be an entirely conventional condenser head as is well known to those skilled in the art. Such a head 12 includes a stretched metal diaphragm and a heavy back plate. The head 12 is surrounded by a protective multi-aperture cap 14. The cap 14 is affixed to one end of a generally cylindrical case 16. The end of the case 16, to which the cap 14 is affixed, is closed by a mounting structure 18 which serves to mount in a conventional manner the head 12.

The case 16 is divided into an upper portion 20 and a lower portion 22 by means of a generally circular transverse divider 24. The upper portion contains an electronic circuit 26 constructed in accordance with a feature of the invention. This circuit 26 is mounted on a circuit board 27 and will be described in greater detail in connection with the discussion of FIGS. 2 and 3. The lower portion 22 of the case 16 includes a conventional battery 28 which may be a conventional radio g-volt battery, and appropriate battery mounting 30. The battery 28 is connected in series to a switch 32 also within the portion 20 which has a manually operated control button projecting out of the case 16 through an opening 34. The lowermost portion of the case 16 is reduced in diameter at 36 to form a reduced diameter cylindrical portion 38 for shielding a plurality of output pins or terminals 40. The pins 40 are entrapped and positioned and the portion 22 enclosed by an insulating disk 42.

It is also preferred that the case 16 have a door (not shown) or other means of easily reaching and replacing the battery 28. For ease of illustration, the interconnecting wires from the pins 40, the battery mounting 30, the switch 34 and the circuit 26 are not shown in the structural illustration of FIG. 1 as these connections will be obvious to anyone skilled in the art from a consideration of the circuit diagrams of FIGS. 2 and 3.

Figure 2:
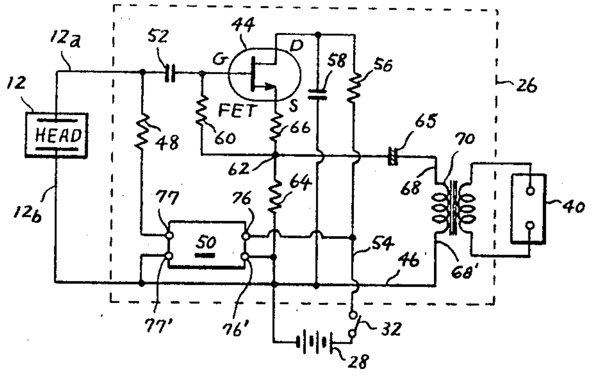
FIG. 2 is a circuit diagram of the apparatus of FIG. 1 with part of the circuit shown in block diagram form for convenience of explanation.

Referring now to FIG. 2 there is depicted the circuit 26, together with the head 12, battery 28, switch 32 and output terminals 40 of the apparatus 10. The circuit 26 employs a field effect transistor (hereafter: FET) 44. The FET is different from conventional transistors. It is a semiconductor element adapted to control a current flowing from its drain (D of FET 44) to its source (S) by an electric field applied to its gate (G). It has been found by the inventors that the FET in the environment herein described may have an input impedance which is increased to substantially the same or more than that of a vacuum tube.

The condenser microphone head 12 has one terminal **12*b* connected to a line 46 which will be used as a reference potential line for the description of the circuit 26. The other terminal 12*a* of the head 12 is connected to a source of high voltage direct current comprising current limiting resistor 48 in series with the high voltage output from terminals 77, 77′ of a DC—DC converter 50. The positive voltage terminal 77 is connetcted to resistor 48 and the terminal 77′ is connected to the reference line 46. The resistance of resistor 48 is relatively high. The output of the terminal 12*a* of the head 12 is also coupled to the gate G of FET 44 through a capacitor 52. The DC—DC converter 50 has input terminals 76, 76′, of which terminal 76′ is connected to the reference line 64, and the terminal 76 is connected to a line 54 which is connected to one terminal of the switch 32. The other terminal of the switch 32 is connected to the positive output terminal of the battery 28. The negative output terminal of the battery 28 is connected to reference line 46. The low voltage of the battery 28 is thus applied directly across the terminals 76, 76′ whenever the switch 32 is closed. The voltage of the battery 28 is also applied, when the switch 32 is closed, to the drain D of the FET 44 via line 54 and a resistor 56. The drain D is also connected via a capacitor 58 to reference line 46. The gate of FET 44 is biased via a resistor 60 which is connected to terminal 62. This terminal 62 is connected via resistor 64 to the reference line 46 and via resistor 66 to the source S of FET 44. The terminal 62 is also connected via capacitor 65 to one input terminal 68 of the primary side of an output transformer 70. The other terminal 68′ of the primary side of the transformer 70 is connected to the reference line 46. The secondary or output side of the transformer 70 is connected directly to the output terminal 40 of the apparatus 10**.

In operation the circuit 26 functions in the cathode follower manner and a signal from the head 12 applied to the gate G of the FET 44 is amplified in its source S-drain D circuit. The FET operates as a source follower type. This amplified signal appears at the terminal 62 and is coupled to the output terminal 40 via output transformer 70. The converter 50 serves to boost the voltage of the battery 28 (usually 4.5 to 9 volts) up to 100 to 150 volts, thereby to produce a DC polarized voltage.

Figure 3:
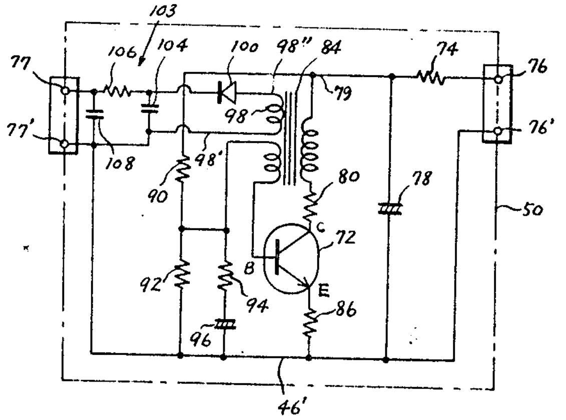
FIG. 3 is a circuit diagram of the block diagram part of the circuit of FIG. 2.

Referring to FIG. 3 there is illustrated the converter 50 of the apparatus 10. The low voltage of the battery 28 is applied to the terminals 76, 76′. A high AC-DC output voltage is obtained from the terminals 77, 77′. The voltage from the terminals 76, 76′ is applied via resistor 74 and bypass capacitor 78 to terminal 79 and a blocking oscillator circuit comprising a transistor 72 having its collector C connected via resistor 80 and one side of a step-up transformer 84 to terminal 79 and has its emitter E connected to a line 46′ via a resistor 86. The terminals 76′ and 77′ are both connected to the reference line 46′ and this designation has therefore been applied to the line 46′ interconnecting these terminals. The base B of the transistor 72 is connected to one of two secondaries of transformer 84 and is properly biased by resistor 90 connected to terminal 79 and the other end of the one secondary. This common connection is also connected to the reference line 46′ by a first resistor 92 in parallel circuit connection with a series connected second resistor 94 and capacitor 96.

The high voltage AC output of the transformer 84 is obtained at a second secondary 98 which has one terminal 98′ connected to a rectifying diode 100. The rectified AC voltage is, of course, a pulsating DC voltage. This DC voltage is smoothed or transferred into a steady DC by a filter circuit 103 comprising a smoothing capacitor 104 connected between the other side of diode 100 and the reference potential, resistor 106 connected between the output of the diode 100 and the terminal 77 and a second smoothing capacitor 108 connected between the terminal 77 and the reference potential line 46′.

This is a blocking oscillator having an oscillation frequency of an infrasonic frequency range such as about 15 c./s. or of an ultrasonic frequency range such as about 50 kc. An AC current obtained from the oscillator circuit is applied to the step-up transformer 84 and is thereby boosted up to approximately 150 volts, obtaining a DC polarized voltage from the terminals 77 and 77′ through the rectifier 100 and the filter circuit 103.

From the viewpoint of improving the signal-to-noise ratio, it is preferred that the oscillation frequency of the oscillator circuit is selected outside of the audio-frequency range.

The principal characteristics of the circuits illustrated in FIGS. 2 and 3 are as follows, which were obtained in our experiments:

| | |
|---|---|
| Insertion loss ________________db__ | 2∼3 |
| Input impedance ________________ | 300MΩ |
| Output impedance ________________ | 600Ω |

The signal-to-noise ratio was about 60 db when an input of sound pressure of 10μ bar of the head was added. These characteristics and others were fully satisfactory. The consumed current of the battery including 200 μa. of the converter 13 was as low as or less than 2 ma. In our experiments a BL006P (9 v.) type dry cell for portable radios, corresponding to the more common Eveready (216) battery, continued for several hours.

The present invention may be applied to a stereo microphone apparatus by forming the condenser microphone heads to be of the stereo type and connecting the circuit shown in FIG. 2 to each electrode pair of the microphone heads. In this case, one DC-DC converter can be used in common to two microphone heads.

It will be apparent that many modifications and variations may be effected without departing from the scope and the novel concepts of the present invention.

We claim as our invention:

1. A condenser microphone apparatus comprising a container, a condenser microphone head of of high output impedance mounted in said container, a field effect transistor mounted in said container and having gate, source and drain electrodes, a capacitor coupling the output of the condenser microphone head to the gate electrode, an impedance connected to the source electrode, an output terminal connected to said impedance, a battery of relatively low voltage connected across the impedance and the source and drain electrodes, a DC-DC converter mounted in said container and having input terminals connected to said battery and converter output terminals connected to said condenser microphone head to provide a polarizing voltage, said converter comprising a transistor oscillator connected to the input terminals of the converter, a transformer with its primary connected in circuit with the oscillator and having a voltage step-up secondary, a rectifier connected to said secondary, and the rectifier connected to the converter output terminals.

2. A condenser microphone according to claim 1 wherein the impedance of the condenser microphone is above 75 megohms at a frequency of 30 Hertz.

References Cited

UNITED STATES PATENTS

| | | | |
|---|---|---|---|
| 3,064,177 | 11/1962 | Bender | 321—2 |
| 3,300,585 | 1/1967 | Reedyk et al. | |
| 3,305,638 | 2/1967 | Teachout. | |

KATHLEEN H. CLAFFY, *Primary Examiner.*

VAN C. WILKS, *Assistant Examiner.*

U.S. Cl. X.R.

179—106; 321—2